Sept. 10, 1929.  H. J. MOYER  1,728,077
BLOW-OFF VALVE
Filed Nov. 7, 1924

Inventor.
Harry J. Moyer.

Patented Sept. 10, 1929.

1,728,077

UNITED STATES PATENT OFFICE.

HARRY J. MOYER, OF CHICAGO, ILLINOIS.

BLOW-OFF VALVE.

Application filed November 7, 1924. Serial No. 748,398.

My invention relates to valves with particular reference to balanced and partially balanced valves for use with very high pressures.

A purpose of my invention is to provide a gland for the laterally apertured tubular valve element with screw retaining means within the body of the valve.

A further purpose is to provide for independent adjustments and tightenings of the upper and lower glands.

A further purpose is to preferably make rigid connection between the bonnet and valve body in a seatless valve.

Further purposes will appear in the specification and in the claims.

I have selected for illustration only two forms of my invention, the forms taken however being of those that are reliable and efficient in operation, easy and inexpensive to manufacture and which well illustrate the principles involved.

Similar numerals indicate like parts in both figures.

Figure 1:
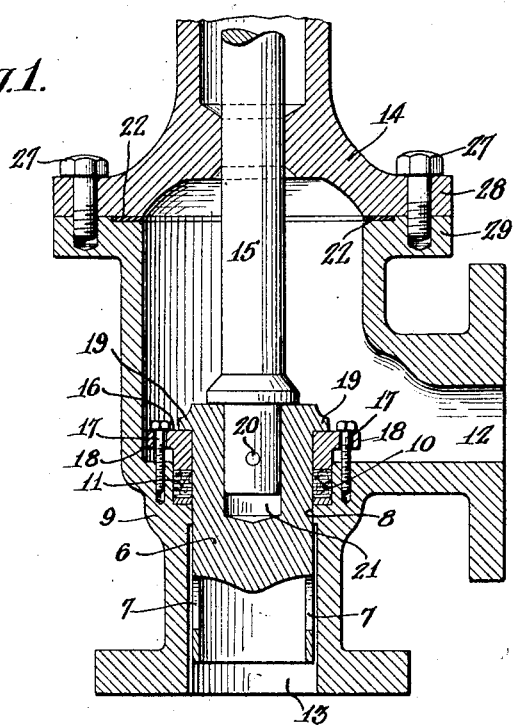
Figure 1 is a vertical section of a structure embodying my invention.

Describing in illustration and not in limitation and referring to the drawings:—

The tubular plug element 6 laterally apertured at 7 fits the bore 8 of the valve body 9. The valve body is counterbored at 10 to provide an annular seat for packing 11 and has inlet 12 on one side of the plug-valve element and outlet 13 on the other side thereof and surrounding it. Bonnet 14 apertured for stem 15 closes the top of the body. The operating means for the valve is not shown in Figure 1.

The gland or follower ring 16 for the packing 11 is held to place by screws 17 threaded into the valve body 9 and loosely passing through the projecting ears or flange 18 circumferentially spaced around the gland.

The plug is laterally flanged at 19 above the gland, engaging the upper face of the gland in closure, pressing the gland down to compress and tighten the packing.

The stem 15 of the plug element is in the form shown in Figure 1 pinned at 20 within the recess 21 in top of the plug.

Figure 2:
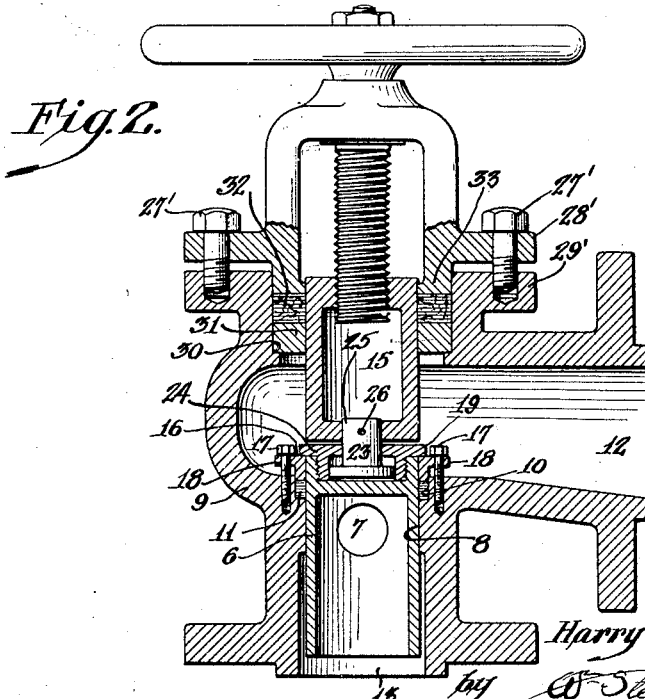
Figure 2 is a vertical section partly in elevation showing a modified form.

If desired there may be loose connection between the stem and plug element as illustrated in Figure 2.

The body has internal diameter beneath the bonnet sufficiently large to pass the lower gland 16 and in the form of Figure 1 is bolted rigidly to the bonnet, a tight joint being secured by usual packing 22.

The bonnet gland and the means for raising and lowering the stem, not completely shown in Figure 1, may be of any usual or special type.

The valve may be balanced partially or wholly. In Figure 1 I show the valve element but partially balanced, the sectional area of the stem being materially less than the sectional area of the plug. In this arrangement when the valve is closing there is an unbalanced force toward closure, increasing any downward force exerted by turning the wheel. This unbalanced pressure is equal to the unbalanced area in square inches, say, times the pressure per square inch within the body. This unbalanced force is directly effective to increase the compression of and therefore the tightness of the packing 11. It is communicated through the plug by means of rim or projection 19 pressing against the gland 16 to press this gland against the packing.

If the valve be completely balanced, as shown in Figure 2, by having the sectional areas of the plug and of the stem the same, there is still an advantage in having the plug provided with radial flange or projection 19 to press against the top of the gland 16, as this permits the gland to be pressed down by turning the valve wheel, tightening the valve as the latter closes.

Where the valve is completely balanced, as in Figure 2, it is advantageous to have a longitudinally loose connection between the stem and its plug. As illustrated this loose connection is obtained by headed pin 23 and bushing 24 threaded into the top of the plug. The shank 25 of the pin passing through the bushing is fastened as by pin 26 in the bottom of the stem member. Preferably the head of the pin 23 has both longitudinal and lateral play.

After the valve shown in Figure 2 has been closed by means of the hand wheel, the longitudinal looseness of connection between the stem member and plug member permits the steam pressure to act across the whole sectional area of the plug, and as the plug presses at 19 against the gland 16, this whole pressure becomes continuously effective to press the gland down upon the packing. Other advantageous features of this loose connection between the stem and plug members include accommodation to any slight difference of alignment between the plug and stem members and greater ease in starting the valve to open. The upwardly-directed and downwardly-directed steam pressures are balanced. Until the lost motion has been taken up the upward pressure on the stem is not balanced and wholly helps the starting.

In Figure 1 the gland and packing around the stem member are of any usual type and steam-tight connection is made between the body and the bonnet through packing 22 and bolts 27 connecting flanges 28 and 29. This construction is particularly desirable when the stem member is considerably smaller sectionally than the plug member, which is the case in Figure 1.

When the valve is nearly or completely balanced by making the stem member nearly as large or as large as the plug member, the structure of the packing around the stem and the mounting between bonnet and body members may advantageously be modified as shown in Figure 2. Here the upper end of the body is counterbored to provide a shoulder 30 which seats a removable ring support 31 for the stem packing 32. The bonnet is provided with a downward flange 33 loosely fitting and closely filling the annular space around the stem containing the packing 32. This flange 33 forms a packing follower ring and is pressed into the packing to any desired extent by means of the retaining bolts 27' which loosely pass through flange 28' of the bonnet to screw into flange 29' of the body.

It is obvious that in both forms shown the fluid pressure within the body of the valve tends to tighten the packing 11, and that in both forms there is provision made for independent adjustments and tightenings of the upper and lower glands, and that in both forms the gland for the plug element is provided with retaining and tightening means located within the body of the valve.

In view of my invention and disclosure variations and modifications to meet individual whim or particular need may well occur to others skilled in the art, and I therefore claim all such variations and modifications in so far as they fall within the reasonable spirit and scope of my invention.

Having thus described my invention, what I claim as new and desire to secure by Letters Patent is:—

1. In a high pressure valve, a valve body having a lateral inlet and an outlet in line with the length of the body, a valve plug fitting in the outlet, fixed packing for the plug, a packing gland surrounding the plug and engaged by the plug when closing to tighten the packing and permanent means for tightening the packing located within and engaging the gland and valve body.

2. In a high pressure valve, a valve body having a lateral inlet and an outlet perpendicular to the inlet, a valve plug movable lengthwise of the outlet, operating means for the plug of smaller diameter within the body than the outlet, a gland and packing surrounding the plug, screw means for tightening the gland against the packing located within the body and projection means upon the plug engaging the gland to transmit the valve operating pressure and the unbalanced fluid pressure within the valve body through the plug to the gland.

3. In a high pressure valve, a tubular plug permitting lateral access, a gland thereabout, a body surrounding the plug and gland and, in closed positions of the valve, circumferentially fitting the plug above the point of access, packing circumferentially fitting the plug and located between the bottom of the gland and the body, screws between the gland and body adapted to press the gland initially into the packing and to limit its upward position while leaving the gland free to further compress the packing, a flange on the plug for engaging the gland when the plug is moved to closed position and operating means for raising and lowering the plug.

4. In a high pressure valve, a tubular plug permitting lateral access, a gland thereabout through which the plug is movable, packing under the gland around the plug, an abutment carried by the plug adapted to engage the gland during valve closure in order to more firmly seat the gland upon its packing, a body surrounding the plug and gland and, in closed positions of the valve, circumferentially fitting the plug above the point of access, and operating means for raising and lowering the plug, and other means within the body adapted to adjustably limit the upward movement of the gland when raising the plug.

5. In a high pressure valve, a tubular plug permitting lateral access, a flange on the plug, a gland about the plug adapted to be engaged by the flange when the plug is in closed position, a body surrounding the plug and gland and in closed valve positions, circumferentially fitting the plug above the point of access, packing annularly fitting the plug and located between the bottom of the gland and the body, screws located outside of the circumference of the packing within the body and between the body and gland presenting at their heads downwardly abutting surfaces toward upwardly abutting surfaces of the gland for adjustably supporting the gland against upward movement during the raising of the plug and operating means for raising and lowering the plug.

6. In a high pressure valve, a tubular plug permitting lateral access, a longitudinally movable gland through which the plug is movable, packing around the plug under the gland adapted to be tightened when the gland is depressed, the plug presenting a downwardly presented abutment adapted to engage during plug depression an upwardly presented abutment of the gland in order to depress the gland in to the packing when the valve is closed, a body surrounding the plug and gland and circumferentially fitting the plug, screws outside of the packing passing through the gland and into the body, adjustably limiting the upward movement of the gland when raising the plug, and operating means for raising and lowering the plug.

HARRY J. MOYER.